June 12, 1956 R. G. CURTIS 2,750,211
JOINT FOR SHEET METAL PIPE
Filed April 3, 1953 3 Sheets-Sheet 1
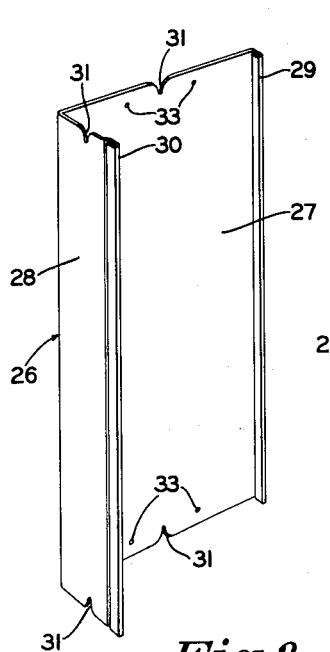
Fig. 2
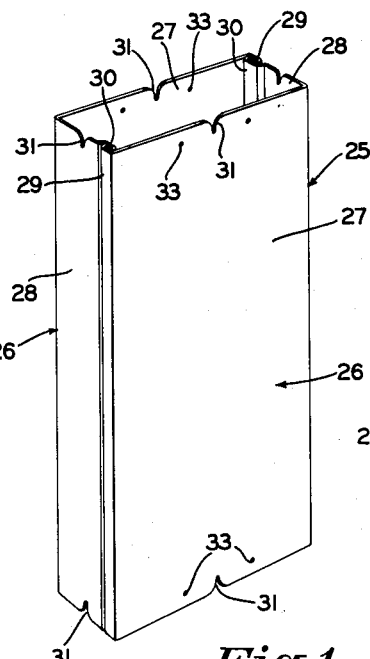
Fig. 1
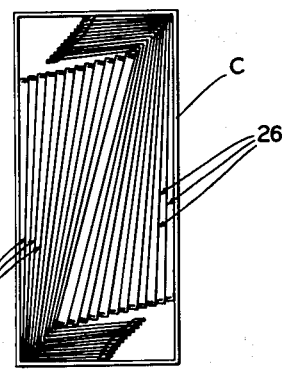
Fig. 3
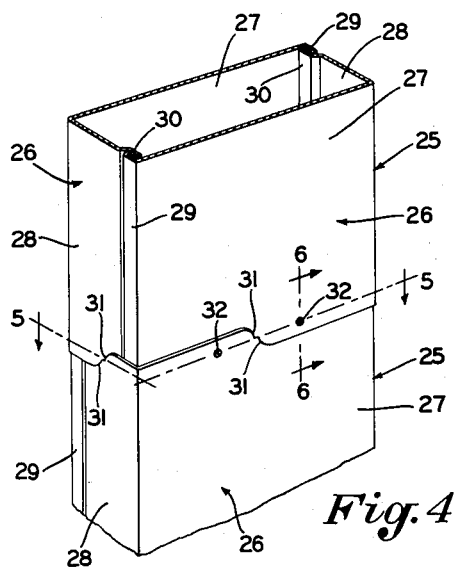
Fig. 4
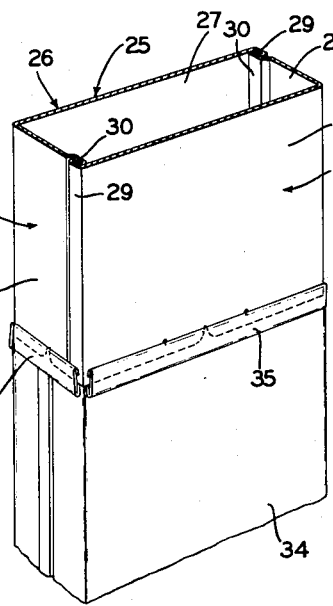
Fig. 6
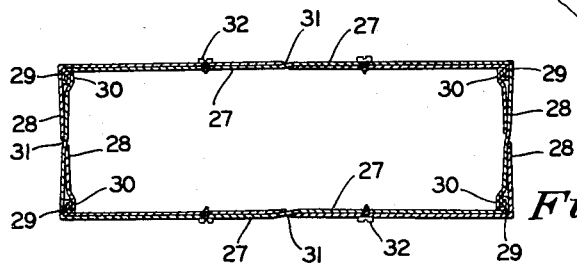
Fig. 5
Fig. 6a
INVENTOR.
Rowland G. Curtis
BY Frease & Bishop
ATTORNEYS June 12, 1956 R. G. CURTIS 2,750,211
JOINT FOR SHEET METAL PIPE
Filed April 3, 1953 3 Sheets-Sheet 2
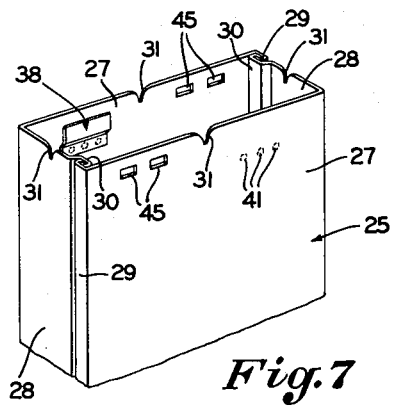
Fig. 7
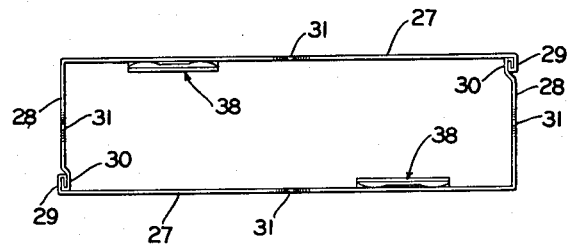
Fig. 7a
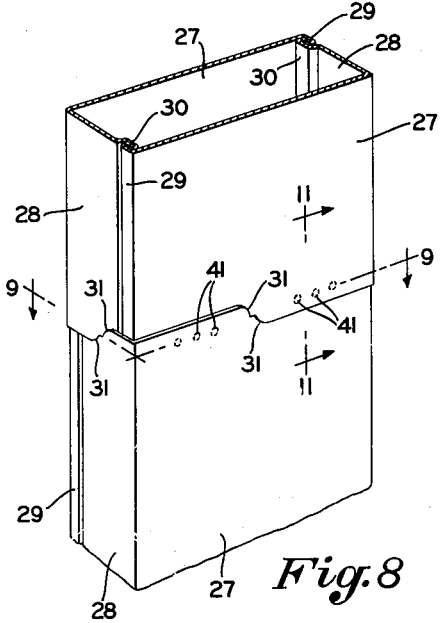
Fig. 8
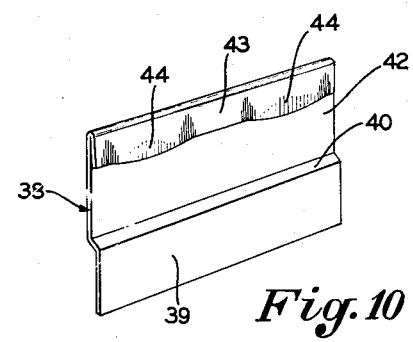
Fig. 10
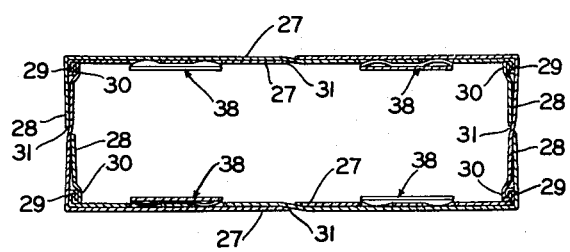
Fig. 9
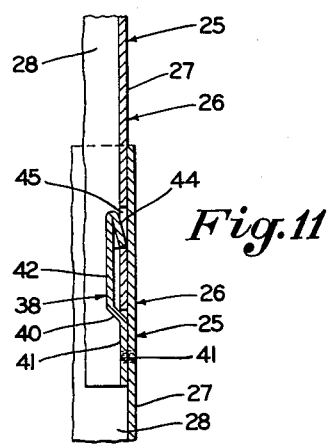
Fig. 11
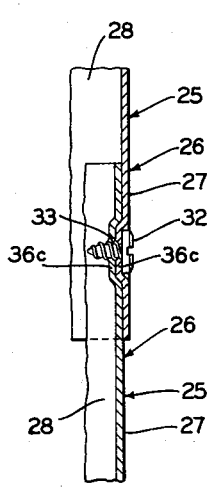
Fig. 13
Fig. 12
INVENTOR.
Rowland G. Curtis
BY
Frease & Bishop
ATTORNEYS

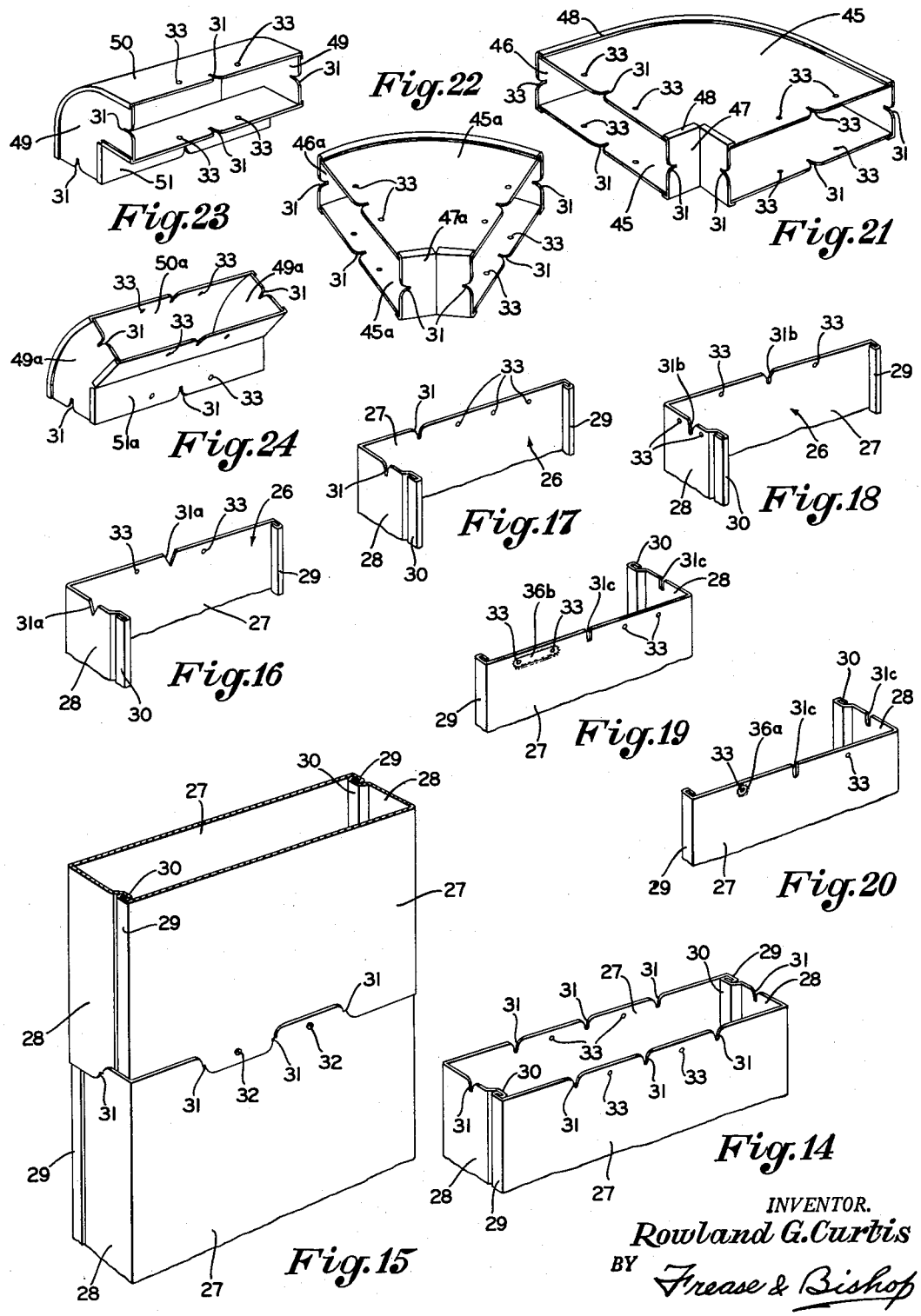

United States Patent Office 2,750,211
Patented June 12, 1956

2,750,211

JOINT FOR SHEET METAL PIPE

Rowland G. Curtis, Dover, Ohio, assignor to Reeves Steel and Manufacturing Company, Dover, Ohio, a corporation of Ohio Application April 3, 1953, Serial No. 346,749

6 Claims. (Cl. 285—201)

The invention relates to ducts or wall pipes for warm air furnaces, and to elbows and similar fittings therefor, and more particularly to certain improvements over the conventional type of such wall pipes and fittings now in general use.

Under present practice such wall pipes are formed of a single sheet of metal bent into rectangular cross-sectional shape and provided with a longitudinal seam at the abutting edges of the sheet. Such pipes have a channel member attached to one end thereof providing a slip joint for receiving the opposite end of a joint of a similar pipe or fitting, screws or the like being used to securely attach the joined ends of adjacent joints together.

With such a construction, even though the seams of the joints of pipe are left open for storage and shipment, it is not possible to nest a number of joints together, whereby considerable space is required for storage and shipment of quantities of the joints. Furthermore, an additional operation is required to weld or otherwise attach the slip joint channel member to one end of each joint or section.

It is therefore an object of the present invention to provide a duct or wall pipe which will overcome the above disadvantages by so constructing the pipes that they may be nested in knocked-down condition so as to occupy a minimum of space for storage and shipment.

This may be accomplished by forming each joint of the pipe of two similar angular members having slip joint formations at their longitudinal edges for sliding engagement with each other to assemble the complete joint of pipe.

Another object of the invention is to so construct each joint or section of the improved duct that it may be interlocked at opposite ends with the adjacent ends of similar joints or sections.

A further object is to provide notches in opposite ends of all walls of each joint or section of the pipe, whereby adjacent ends of similar joints or sections may be easily connected together without the attachment of a separate attachment member.

A still further object is to provide such a pipe in which the adjacent ends of similar joints or sections of the improved duct are connected together by overlapping the adjacent end portions of the joints and alternately locating the overlapped portion of each joint upon the interior and the exterior of the adjacent joint.

Another object is to provide a duct of this character which is so constructed that either end thereof may be inserted into the conventional slip joint channel attaching member of ducts such as are now in general use.

The above objects together with others which will be apparent from the drawings and following description, or which may be later referred to, may be attained by constructing the improved wall pipe and fittings in the manner hereinafter described in detail and illustrated in the accompanying drawings, in which:

Fig. 1 is a perspective view of a joint of wall pipe embodying the invention;

Fig. 2 a detached perspective view of one of the two similar members forming a joint of the improved wall pipe;

Fig. 3 a sectional view showing the manner in which a quantity of the improved wall pipe may be nested in knocked-down condition for storage or shipping;

Fig. 4 a fragmentary perspective view of portions of two joints of the wall pipe showing the manner in which the joints are connected together at their ends;

Fig. 5 a transverse section taken as on the line 5—5, Fig. 4, showing the manner in which the overlapped ends of two joints of the pipe are located alternately on the exterior and interior;

Fig. 6 an enlarged, detail section taken as on the line 6—6, Fig. 4;

Fig. 6a a fragmentary perspective view showing a joint of the improved pipe connected to a joint of conventional wall pipe;

Fig. 7 a fragmentary perspective view of one end portion of a slightly modified form of the pipe;

Fig. 7a a top plan view of a joint of pipe such as shown in Fig. 7;

Fig. 8 a fragmentary perspective view of adjacent end portions of two joints of the modified form of pipe, showing the manner in which the joints are connected together at their ends;

Fig. 9 a transverse sectional view through the overlapped ends of two joints of the pipe, taken as on the line 9—9, Fig. 8;

Fig. 10 an enlarged perspective view of one of the clips used in the modified form of pipe;

Fig. 11 an enlarged fragmentary section, taken as on the line 11—11, Fig. 8;

Fig. 12 a fragmentary section similar to Fig. 6, showing a slight modification;

Fig. 13 a similar view showing another modification;

Fig. 14 a fragmentary perspective view of one end portion of a joint of the improved wall pipe showing a further modification;

Fig. 15 a fragmentary perspective view of adjacent end portions of two joints of pipe such as shown in Fig. 14, showing the manner in which the joints are connected together;

Figs. 16 to 20 are detached fragmentary perspective views of the end portions of one of the two similar members forming a joint of the pipe, showing several further modifications;

Fig. 21 a perspective view of a horizontal elbow embodying the invention;

Fig. 22 a perspective view of a horizontal angle fitting embodying the invention;

Fig. 23 a perspective view of a vertical elbow embodying the invention; and,

Fig. 24 a perspective view of a vertical angle fitting embodying the invention.

Referring first more particularly to the preferred form of the invention as shown in Figs. 1 to 6a, in which similar numerals refer to similar parts throughout, the improved wall pipe or duct is formed in points of suitable length as indicated generally at 25.

Each joint of the pipe is formed of two similar members as indicated generally at 26 and shown in detail in Fig. 2, adapted to be connected together by slip joints, whereby the pipes may be stored and shipped in knocked-down or disassembled condition in order to conserve space.

The angular members 26 are both identical in construction each comprising the relatively wide side wall 27 and the relatively narrow side wall 28 of suitable dimensions to form a pipe joint of desired cross-sectional size and shape, and of a length desired in a joint or section of the pipe.

For the purpose of easily and readily connecting the members 26 together to form a joint of the pipe, mating slip joint formations 29 and 30 are formed at the longitudinal edges of the side walls 27 and 28 respectively of each member 26, whereby two of these members may be longitudinally slidably connected together, without requiring the use of tools, to form a pipe joint 25, such as shown in detail in Fig. 1.

By thus forming the pipe joints from two detachably connected members, such as shown at 26, they may be stored and shipped in knocked-down condition, the members 26 being closely nested together in packages or cartons C, as shown in Fig. 3, a considerable number of knocked-down pipe joints being enclosed within a space only slightly greater than that required for a single joint of the pipe in assembled condition.

For the purpose of connecting the adjacent ends of joints of the improved wall pipe together, without requiring the attachment of an additional member, such as the usual slip joint collar, each end of each wall 27 and 28 is notched, as indicated at 31, these notches being preferably centrally located as shown in Figs. 1 and 2, and being of the shape shown in these figures, that is of substantially V-shape with rounded edges.

This shape of notch permits the ends of adjacent joints of the pipe to be easily and readily overlapped in the manner shown in Figs. 4 and 5, in order to attach the joints together. In so placing two joints of the pipe together in end to end relation, the notches 31 at the adjacent ends of the two joints are engaged with each other and the overlapped end portions of each joint are alternately located upon the exterior and the interior of the other joint.

As shown in Figs. 4 and 5, the diagonally opposed corners of each joint 25 are provided with the slip joints 29 and 30 and located within the other joint, so as to permit the end portions of the walls 27 and 28 of the two joints to fit closely together throughout the entire cross-sectional area of the pipe.

The two joints of pipe are thus snugly interlocked end to end, providing a substantially air tight connection therebetween. If desired, screws 32 may be located through the registering apertures 33 in the end portions of the two joints of pipe, so as to positively secure the joints together.

As shown in Fig. 6a, the improved wall pipe joints may be connected to joints of conventional wall pipe as indicated at 34, provided with the usual slip joint collars 35, by inserting one end of a joint 25 of the improved pipe into the slip joint collar 35 of the conventional pipe. In the same manner, any of the conventional elbows or other fittings provided with the usual slip joint collar may be attached to either end of a joint of the improved pipe.

As shown in Fig. 12, the screw holes 33 in the end portions of each pipe joint which are located on the interior of the end screw, may be located in depressions 36, which may be round, as indicated at 36a in Fig. 20, or elongated as indicated at 36b in Fig. 19, to provide a slight space 37 around the screw 32 to receive any burrs formed in the sheet metal by the screws, so that the overlapped end portions of the two joints may be drawn tightly together.

If it is desired to locate the heads of the screws substantially flush with the outer surface of the pipe, both overlapping end portions of the pipe joints may be provided with depressions as shown at 36c in Fig. 13.

In Figs. 16 to 20 are shown slight variations in the shape and arrangement of the notches in the ends of the pipe joints and the arrangement and location of the screw holes. For instance, in Fig. 16 the notches 31a are V-shape with straight sides, and a single screw hole 33 is located on each side of the notch in the wider side wall 26.

In Fig. 17, the notch 31 in the end of the wall 26 is located considerably closer to the inner edge thereof, and three screw holes 33 are located between the notch and the outer edge of said wall. The notches 31b in Fig. 18 are of slightly different shape, and a screw hole 33 is located on each side of each notch in both walls 26 and 27.

In Figs. 19 and 20 the notches 31c are shown as straight slits, and the screw holes 33 are as described above, two screw holes being located on each side of the notch in the side wall 27 in Fig. 19, the screw holes on one side of the notch being located in an elongated depression 36b, while in Fig. 20, the single screw hole on one side of the notch 31c is located in a round depression 36a while the screw holes on the other side of the notch is not depressed.

In Figs. 7 to 11 is shown a modification of the pipe, in which no screws are required to secure overlapped ends of adjacent pipe joints together. In this form of the invention, the pipe joints are made and assembled in the manner above described and the same reference numerals are applied to corresponding parts as in Figs. 1 to 7.

In this form of the pipe means is provided for automatically securing the overlapped ends of adjacent pipe joints together. This means comprises the clips 38 attached to each end of each wall 27 of each joint, upon the interior thereof, and at a point near one edge of the wall 27.

Each of these clips, as shown in Fig. 10, is formed of a substantially rectangular piece of sheet metal, the lower portion 39 of which is outwardly offset, as at 40 and attached to the inner surface of the wall 27, as by spot welding, as indicated at 41.

The upper portion 42 of the clip is thus spaced from the inner surface of the wall 27 and the upper edge portion thereof is folded down upon itself as at 43 with spaced portions thereof inclined downward and outward, forming locking shoulders 44 adapted to enter the spaced openings 45 in the adjacent end portion of a similar pipe joint, as best indicated in Fig. 11.

It will thus be seen that as two joints of the pipe are connected end to end, by overlapping the adjacent end portions of the two joints in the manner above described, the overlapping end portions of each joint will be received in the clips 38 of the other joint, and the locking shoulders 44 of each clip will snap into place within the openings 45 in the end portion of the other joint, locking the two joints securely together.

In Figs. 14 and 15 is shown another slight modification in which there may be a plurality of equally spaced notches 31 in each side wall 27 of each joint of the pipe, with screw holes 33 located therebetween, so that the adjacent end portions of two joints of the pipe may be overlapped in the manner shown in Fig. 15 and secured together by screws 32.

In Figs. 21 to 24 are shown examples of a few of the many elbows and other fittings which may be constructed in accordance with the invention, with the end portions thereof provided with notches 31 and screw holes 33 for overlapping and interengagement with joints of the improved pipe as shown in Figs. 1 to 7.

In Fig. 21 is shown a horizontal, 90 degree elbow comprising two similar flat walls 45 provided in opposite ends with notches 31 and screw holes 33 on each side thereof. These side walls 45 are jointed together in spaced parallel relation by the arcuate outer wall 46 and the angular inner wall 47, any conventional form of seams as shown at 48 being provided for connecting the parts together.

In Fig. 22 is shown a horizontal angle fitting or 45 degree elbow, constructed in much the same manner as the elbow shown in Fig. 21, the spaced, parallel flat side walls 45a having the central notches 31 and spaced screw holes 33 in opposite end portions and being joined by the arcuate outer wall 46a and angular inner wall 47a, each of which have notches 31 at opposite ends.

A 90 degree vertical elbow is shown in Fig. 23, in which the flat end walls 49 are provided at opposite ends with notches 31 and are joined by the arcuate outer wall 50 and angular inner wall 51, each of which has a central notch 31 and spaced screw holes 33 in each end portion.

The vertical 45 degree elbow, or angular fitting, shown in Fig. 24, is made in a similar manner comprising the spaced flat end walls 49a with notches 31 at each end and the curved outer wall 50a and angular inner walls 51a, each of which has a central notch 31 and spaced screw holes 33 in opposite ends.

From the above it will be obvious that a simple, inexpensive and satisfactory wall pipe or duct for warm air furnaces and the like is provided, in which joints of the pipe may be connected end to end to each other, or to various fittings, by overlapping adjacent end portions of two members together in the manner illustrated and described, with alternate end portions of each member being located upon the exterior and interior of the other member.

This construction permits for easily and readily connecting the joints and fittings together end to end, without requiring the conventional slip joint collar as now in general use. It will also be seen that where occasion may require, joints or fittings constructed in accordance with the invention may be connected end to end with joints or fittings of conventional form provided with the usual slip joint collar.

It will also be evident that by making each joint of the improved pipe in the manner illustrated and described, by detachably connecting two similar members together with slip joints, the joints of the pipe may be stored and shipped, nested in unlocked or disassembled condition, requiring a minimum of space, thus providing a considerable economy both in storage space and in shipping cost of the pipe.

In the installation of the improved pipe for a heating or cooling system, if it is necessary to cut off an end portion of a pipe joint, the cut-off end may be notched, or it may be connected to another joint of the improved pipe without notching.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details disclosed.

Having now described the invention or discovery, the construction, the operation and use of preferred embodiments thereof, and the advantageous new and useful results obtained thereby; the new and useful constructions, and reasonable mechanical equivalents thereof obvious to those skilled in the art, are set forth in the appended claims.

I claim:

1. In a sheet metal duct of the type having a pair of tubular sections of substantially rectangular cross section, there being correspondingly positioned notches in opposite ends of each of the four side walls of each tubular section, the tubular sections being connected together end to end by engaging the notches in opposed ends of the two tubular sections and overlapping said opposed ends of the two tubular sections alternately inside and outside of each other around the entire perimeter of said tubular sections, the overlapping portions of said tubular sections at each corner of the duct being angular in cross section.

2. In a sheet metal duct of the type having a pair of tubular sections of substantially rectangular cross section, there being correspondingly positioned notches in opposite ends of each of the four side walls of each tubular section, the tubular sections being connected together end to end by engaging the notches in opposed ends of the two tubular sections and overlapping said opposed ends of the two tubular sections alternately inside and outside of each other around the entire perimeter of said tubular sections, the overlapping portions of said tubular sections at each corner of the duct being angular in cross section, there being correspondingly positioned screw holes in opposite ends of each tubular section and screws in said screw holes securing the overlapped ends together.

3. In a sheet metal duct of the type having a pair of tubular sections of substantially rectangular cross section, there being correspondingly positioned notches in opposite ends of each of the four side walls of each tubular section, the tubular sections being connected together end to end by engaging the notches in opposed ends of the two tubular sections and overlapping said opposed ends of the two tubular sections alternately inside and outside of each other around the entire perimeter of said tubular sections, the overlapping portions of said tubular sections at each corner of the duct being angular in cross section, there being correspondingly positioned screw holes in opposite ends of each tubular section and screws in said screw holes securing the overlapped ends together, there being depressions in the sheet metal in which certain of the screw holes are located.

4. In a sheet metal duct of the type having a pair of tubular sections of substantially rectangular cross section, there being correspondingly positioned notches in opposite ends of each of the four side walls of each tubular section, the tubular sections being connected together end to end by engaging the notches in opposed ends of the two tubular sections and overlapping said opposed ends of the two tubular sections alternately inside and ouside of each other, around the entire perimeter of said tubular sections, the overlapping portions of said tubular sections at each corner of the duct being angular in cross section, locking clips located on the interior of each tubular section at opposite ends thereof and openings in each end of each tubular section for locking engagement with said locking clips for securing the overlapped ends of the two tubular sections together.

5. In a sheet metal duct of the type having a pair of tubular sections of substantially rectangular cross section, one spaced pair of side walls of each tubular section being of greater width than the other pair, there being correspondingly positioned notches in opposite ends of each of the four side walls of each tubular section, the tubular sections being connected together end to end by engaging the notches in opposed ends of the two tubular sections and overlapping said opposed ends of the two tubular sections alternately inside and outside of each other around the entire perimeter of said tubular sections, the overlapping portions of said tubular sections at each corner of the duct being angular in cross section, locking clips located on the interior of each of the wider walls of each tubular section and openings in each end of the wider walls of each tubular section for locking engagement with said locking clips for securing the overlapped ends of the tubular sections together.

6. In a sheet metal duct of the type having a pair of tubular sections of substantially rectangular cross section, one spaced pair of side walls of each tubular section being of greater width than the other pair, there being correspondingly positioned notches in opposite ends of each of the four side walls of each tubular section, the tubular sections being connected together end to end by engaging the notches in opposed ends of the two tubular sections and overlapping said opposed ends of the two tubular sections alternately inside and outside of each other around the entire perimeter of said tubular sections, the overlapping portions of said tubular sections at each corner of the duct being angular in cross section, the notches in the narrow side walls being centrally located and the notches in the wider side walls being located between the center and one edge thereof.

References Cited in the file of this patent

UNITED STATES PATENTS

| | | | |
|---|---|---|---|
| 219,645 | Miller | Sept. 16, | 1879 |
| 789,107 | Steele | May 2, | 1905 |
| 828,899 | Parker | Aug. 21, | 1906 |
| 1,163,958 | Sliemers | Dec. 14, | 1915 |
| 1,268,980 | Krumholz | June 11, | 1918 |
| 1,301,565 | Jacobs | Apr. 22, | 1919 |
| 2,201,409 | Siebenlist | May 21, | 1940 |
| 2,274,785 | Gray | Mar. 3, | 1942 |
| 2,275,572 | Somers | Mar. 10, | 1942 |